United States Patent
Yamaguchi et al.

(10) Patent No.: US 10,858,272 B2
(45) Date of Patent: Dec. 8, 2020

(54) BARIUM-SULFATE SCALE DEPOSITION INHIBITOR, METHOD FOR INHIBITING BARIUM-SULFATE SCALE DEPOSITION, AND BARIUM-SULFATE SCALE DEPOSITION INHIBITOR COMPOSITION

(71) Applicant: Nippon Shokubai Co., Ltd., Osaka (JP)

(72) Inventors: Shigeru Yamaguchi, Osaka (JP); Yui Nishida, Osaka (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 270 days.

(21) Appl. No.: 15/762,782

(22) PCT Filed: Aug. 18, 2016

(86) PCT No.: PCT/JP2016/074129
§ 371 (c)(1),
(2) Date: Mar. 23, 2018

(87) PCT Pub. No.: WO2017/051640
PCT Pub. Date: Mar. 30, 2017

(65) Prior Publication Data
US 2018/0265384 A1    Sep. 20, 2018

(30) Foreign Application Priority Data
Sep. 24, 2015    (JP) .................................. 2015-186598

(51) Int. Cl.
| | | |
|---|---|---|
| *C02F 5/10* | (2006.01) | |
| *C09K 8/528* | (2006.01) | |
| *C08F 220/06* | (2006.01) | |
| C08L 33/02 | (2006.01) | |
| *C08F 216/14* | (2006.01) | |
| C02F 101/10 | (2006.01) | |
| C02F 103/08 | (2006.01) | |
| C02F 103/10 | (2006.01) | |
| C08L 33/26 | (2006.01) | |

(52) U.S. Cl.
CPC .............. *C02F 5/10* (2013.01); *C08F 220/06* (2013.01); *C09K 8/528* (2013.01); *C02F 2101/101* (2013.01); *C02F 2103/08* (2013.01); *C02F 2103/10* (2013.01); *C08F 216/14* (2013.01); *C08L 33/02* (2013.01); *C08L 33/26* (2013.01); *C08L 2201/54* (2013.01)

(58) Field of Classification Search
CPC .............. C08F 220/06; C08F 216/1466; C08F 216/14; C02F 2101/101; C02F 2103/08; C02F 2103/10; C02F 5/10; C08L 2201/54; C08L 33/02; C08L 33/26; C09K 8/528
See application file for complete search history.

(56) References Cited

U.S. PATENT DOCUMENTS

| | | |
|---|---|---|
| 4,039,459 A | 8/1977 | Fischer |
| 4,937,002 A | 6/1990 | Bainbridge |
| 6,166,149 A | 12/2000 | Yamaguchi |
| 2004/0127660 A1 | 7/2004 | Fukuhara |
| 2011/0251115 A1 | 10/2011 | Dupont |

FOREIGN PATENT DOCUMENTS

| | | |
|---|---|---|
| EP | 1 719 784 A1 | 11/2006 |
| JP | 11-80288 A | 3/1999 |
| JP | 2004-217899 A | 8/2004 |
| JP | 2015-151414 A | 8/2015 |
| WO | 94/003706 A1 | 2/1994 |
| WO | 2010/024448 A1 | 3/2010 |

OTHER PUBLICATIONS

English language machine translation of JP2015151414, 45 Pages, No Date.*
International Search Report for PCT/JP2016/074129 dated Nov. 15, 2016.

* cited by examiner

*Primary Examiner* — Pranav N Patel
(74) *Attorney, Agent, or Firm* — Pearne & Gordon LLP

(57) ABSTRACT

Provided are a barium-sulfate scale inhibitor and a barium-sulfate scale inhibitor composition each of which can express a high barium-sulfate scale-inhibiting ability. Also provided is a method of inhibiting a barium-sulfate scale that can express a high barium-sulfate scale-inhibiting ability. The barium-sulfate scale inhibitor of the present invention includes a sulfonic acid group-containing copolymer obtained by polymerizing a monomer composition containing a carboxyl group-containing monomer and a sulfonic acid group-containing monomer, in which when the barium-sulfate scale inhibitor is added at a solid content concentration of 1 wt % to high-salt-concentration water having a metal salt concentration of 10 wt % or more, the sulfonic acid group-containing copolymer is free from precipitating.

5 Claims, No Drawings

BARIUM-SULFATE SCALE DEPOSITION INHIBITOR, METHOD FOR INHIBITING BARIUM-SULFATE SCALE DEPOSITION, AND BARIUM-SULFATE SCALE DEPOSITION INHIBITOR COMPOSITION

TECHNICAL FIELD

The present invention relates to a barium-sulfate scale inhibitor, a method of inhibiting a barium-sulfate scale, and a barium-sulfate scale inhibitor composition.

BACKGROUND ART

In crude oil drilling, a pressure in an oil reservoir reduces as crude oil is collected. Accordingly, only about several tens of percent of the crude oil present in the oil reservoir can be recovered, and hence most of the crude oil is left in the oil reservoir to lead to a reduction in crude oil recovery ratio. One of the most important problems in oil development business is to improve such low crude oil recovery ratio.

A method involving pressing water or a gas into the oil reservoir or a method involving mixing the crude oil with a chemical to improve the fluidity of the crude oil has heretofore been performed for improving the crude oil recovery ratio. In particular, in the case of an offshore oilfield in which the crude oil drilling is performed on the sea, seawater has been pressed into the oil reservoir for the purpose of retaining the pressure in the oil reservoir. At that time, a weighting agent called barite, which contains barium sulfate as a main component, is used as an agent for adjusting the specific gravity of the seawater in combination with the seawater.

The seawater originally contains about 0.03 ppm of a barium ion and a sulfate thereof. In addition, the addition of such weighting agent as described above to the seawater further increases the content of the barium ion and the sulfate thereof in the seawater.

Barium sulfate is a water-insoluble compound. Therefore, when the seawater having added thereto such weighting agent as described above is pressed into the oil reservoir, a problem in that water-insoluble barium sulfate in the seawater serves as a scale to be deposited in a large amount on a drilling pipe or the like occurs. When a large amount of the barium-sulfate scale is deposited on the drilling pipe or the like as described above, serious problems, i.e., the pressure loss and clogging of a drilling machine occur.

Several reports on the suppression of the barium-sulfate scale have heretofore been made (for example, Patent Literatures 1 to 5).

However, in view of a recent trend in which a crude oil reserve in a developed oilfield is reducing, a further improvement in crude oil recovery ratio by the achievement of a higher degree of barium-sulfate scale inhibition under more severe conditions, such as a high metal salt concentration (e.g., Na or Ca) and high temperature, has been strongly required.

CITATION LIST

Patent Literature

[PTL 1] U.S. Pat. No. 4,937,002 A
[PTL 2] EP 1719784 A1
[PTL 3] U.S. Pat. No. 4,039,459 A
[PTL 4] WO 1994/003706 A1
[PTL 5] WO 2010/024448 A1

SUMMARY OF INVENTION

Technical Problem

An object of the present invention is to provide a barium-sulfate scale inhibitor and a barium-sulfate scale inhibitor composition each of which can express a high barium-sulfate scale-inhibiting ability. Another object of the present invention is to provide a method of inhibiting a barium-sulfate scale that can express a high barium-sulfate scale-inhibiting ability.

Solution to Problem

According to one embodiment of the present invention, there is provided a barium-sulfate scale inhibitor, including a sulfonic acid group-containing copolymer obtained by polymerizing a monomer composition containing a carboxyl group-containing monomer and a sulfonic acid group-containing monomer, in which when the barium-sulfate scale inhibitor is added at a solid content concentration of 1 wt % to high-salt-concentration water having a metal salt concentration of 10 wt % or more, the sulfonic acid group-containing copolymer is free from precipitating.

In one embodiment, the metal salt concentration is from 10 wt % to 30 wt %.

In one embodiment, a content ratio "carboxyl group-containing monomer/sulfonic acid group-containing monomer" of the carboxyl group-containing monomer to the sulfonic acid group-containing monomer is from 71/29 to 98/2 in terms of a weight ratio.

In one embodiment, the carboxyl group-containing monomer includes (meth)acrylic acid (salt).

In one embodiment, the sulfonic acid group-containing monomer includes a sulfonic acid group-containing ether compound represented by the general formula (1):

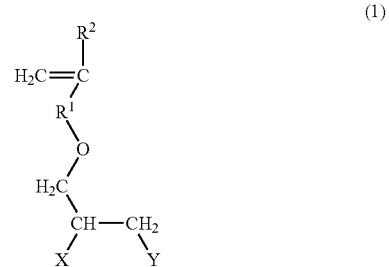

in the general formula (1), $R^1$ represents any one of a single bond, $CH_2$, and $CH_2CH_2$, $R^2$ represents any one of H and $CH_3$, and one of X and Y represents a hydroxyl group, and another thereof represents a sulfonic acid (salt) group.

In one embodiment, the sulfonic acid group-containing ether compound includes at least one kind selected from 3-(meth)allyloxy-2-hydroxy-1-propanesulfonic acid (salt), 2-acrylamido-2-methylpropanesulfonic acid (salt), (meth)allylsulfonic acid (salt), vinylsulfonic acid (salt), styrenesulfonic acid (salt), 2-sulfoethyl (meth)acrylate, and 2-methyl-1,3-butadiene-1-sulfonic acid (salt).

In one embodiment, the sulfonic acid group-containing ether compound includes 3-(meth)allyloxy-2-hydroxy-1-propanesulfonic acid (salt).

According to another embodiment of the present invention, there is provided a method of inhibiting formation of a barium-sulfate scale in a drilling pipe in crude oil drilling, the method including adding, to the drilling pipe, a barium-sulfate scale inhibitor containing a sulfonic acid group-containing copolymer obtained by polymerizing a monomer composition containing a carboxyl group-containing monomer and a sulfonic acid group-containing monomer, the sulfonic acid group-containing copolymer being free from precipitating when the barium-sulfate scale inhibitor is added at a solid content concentration of 1 wt % to high-salt-concentration water having a metal salt concentration of 1 wt % or more.

In one embodiment, the metal salt concentration is from 10 wt % to 30 wt %.

In one embodiment, the barium-sulfate scale inhibitor is added to the high-salt-concentration water present in the drilling pipe so that a concentration of the barium-sulfate scale inhibitor is from 0.1 ppm to 1,000 ppm in terms of a solid content.

In one embodiment, a content ratio "carboxyl group-containing monomer/sulfonic acid group-containing monomer" of the carboxyl group-containing monomer to the sulfonic acid group-containing monomer is from 71/29 to 98/2 in terms of a weight ratio.

In one embodiment, the carboxyl group-containing monomer includes (meth)acrylic acid (salt).

In one embodiment, the sulfonic acid group-containing monomer includes a sulfonic acid group-containing ether compound represented by the general formula (1):

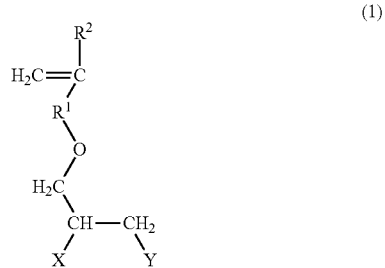

(1)

in the general formula (1), $R^1$ represents any one of a single bond, $CH_2$, and $CH_2CH_2$, $R^2$ represents any one of H and $CH_3$, and one of X and Y represents a hydroxyl group, and another thereof represents a sulfonic acid (salt) group.

In one embodiment, the sulfonic acid group-containing ether compound includes at least one kind selected from 3-(meth)allyloxy-2-hydroxy-1-propanesulfonic acid (salt), 2-acrylamido-2-methylpropanesulfonic acid (salt), (meth)allylsulfonic acid (salt), vinylsulfonic acid (salt), styrenesulfonic acid (salt), 2-sulfoethyl (meth)acrylate, and 2-methyl-1,3-butadiene-1-sulfonic acid (salt).

In one embodiment, the sulfonic acid group-containing ether compound includes 3-(meth)allyloxy-2-hydroxy-1-propanesulfonic acid (salt).

According to still another embodiment of the present invention, there is provided a barium-sulfate scale inhibitor composition, including:
water; and
a sulfonic acid group-containing copolymer obtained by polymerizing a monomer composition containing a carboxyl group-containing monomer and a sulfonic acid group-containing monomer.

In one embodiment, a content of the sulfonic acid group-containing copolymer in the barium-sulfate scale inhibitor composition with respect to the water is from 0.1 ppm to 1,000 ppm in terms of a solid content.

In one embodiment, when the sulfonic acid group-containing copolymer is added at a solid content concentration of 1 wt % to high-salt-concentration water having a metal salt concentration of 10 wt % or more, the sulfonic acid group-containing copolymer is free from precipitating.

In one embodiment, the metal salt concentration is from 10 wt % to 30 wt %.

In one embodiment, the carboxyl group-containing monomer includes (meth)acrylic acid (salt).

In one embodiment, the sulfonic acid group-containing monomer includes a sulfonic acid group-containing ether compound represented by the general formula (1):

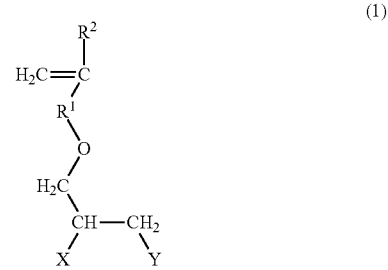

(1)

in the general formula (1), $R^1$ represents any one of a single bond, $CH_2$, and $CH_2CH_2$, $R^2$ represents any one of H and $CH_3$, and one of X and Y represents a hydroxyl group, and another thereof represents a sulfonic acid (salt) group.

In one embodiment, the sulfonic acid group-containing ether compound includes at least one kind selected from 3-(meth)allyloxy-2-hydroxy-1-propanesulfonic acid (salt), 2-acrylamido-2-methylpropanesulfonic acid (salt), (meth)allylsulfonic acid (salt), vinylsulfonic acid (salt), styrenesulfonic acid (salt), 2-sulfoethyl (meth)acrylate, and 2-methyl-1,3-butadiene-1-sulfonic acid (salt).

In one embodiment, the sulfonic acid group-containing ether compound includes 3-(meth)allyloxy-2-hydroxy-1-propanesulfonic acid (salt).

Advantageous Effects of Invention

According to the present invention, the barium-sulfate scale inhibitor and the barium-sulfate scale inhibitor composition each of which can express a high barium-sulfate scale-inhibiting ability can be provided. In addition, according to the present invention, the method of inhibiting a barium-sulfate scale that can express a high barium-sulfate scale-inhibiting ability can be provided, and hence a reduction in productivity due to the production of a scale at the time of oil production can be suppressed. When the barium-sulfate scale inhibitor or barium-sulfate scale inhibitor composition of the present invention is used in crude oil drilling, serious problems, i.e., the pressure loss and clogging of a drilling machine due to the deposition of a barium-sulfate scale on a drilling pipe or the like can be reduced. In addition, when the method of inhibiting a barium-sulfate scale of the present invention is used in the crude oil drilling, the serious problems, i.e., the pressure loss and clogging of the drilling machine due to the deposition of the barium-sulfate scale on the drilling pipe or the like can be reduced.

DESCRIPTION OF EMBODIMENTS

As used herein, the term "(meth)acrylic" means "acrylic and/or methacrylic", the term "(meth)acrylate" means "acrylate and/or methacrylate", the term "(meth)allyl" means "allyl and/or methallyl", and the term "(meth)acrolein" means "acrolein and/or methacrolein". In addition, the term "acid (salt)" as used herein means "an acid and/or a salt thereof." In addition, the term "weight" as used herein may be replaced with the term "mass" that has heretofore been generally commonly used as a unit of weight, and meanwhile, the term "mass" as used herein may be replaced with the term "weight" that has been commonly used as an SI unit representing weight.

<<Barium-Sulfate Scale Inhibitor>>

A barium-sulfate scale inhibitor of the present invention contains a sulfonic acid group-containing copolymer obtained by polymerizing a monomer composition containing a carboxyl group-containing monomer and a sulfonic acid group-containing monomer.

The content of the sulfonic acid group-containing copolymer obtained by polymerizing the monomer composition containing the carboxyl group-containing monomer and the sulfonic acid group-containing monomer in the barium-sulfate scale inhibitor of the present invention is preferably from 50 wt % to 100 wt %, more preferably from 70 wt % to 100 wt %, still more preferably from 90 wt % to 100 wt %, particularly preferably from 95 wt % to 100 wt %, most preferably substantially 100 wt % because the effects of the present invention can be more sufficiently expressed.

The sulfonic acid group-containing copolymer is obtained by polymerizing the monomer composition containing the carboxyl group-containing monomer and the sulfonic acid group-containing monomer.

The carboxyl group-containing monomers may be used alone or in combination thereof. The sulfonic acid group-containing monomers may be used alone or in combination thereof.

Any appropriate carboxyl group-containing monomer may be adopted as the carboxyl group-containing monomer to the extent that the effects of the present invention are not impaired. Examples of such carboxyl group-containing monomer include (meth)acrylic acid (salt), maleic acid (salt), and itaconic acid (salt). Of those carboxyl group-containing monomers, (meth)acrylic acid (salt) is preferred because the effects of the present invention can be more sufficiently expressed.

The salt of (meth)acrylic acid (salt) is represented by Z in a —COOZ group. Z represents a metal atom, an ammonium group (constituting an ammonium salt, that is, COONH$_4$), or an organic amino group (constituting an organic amine salt). Examples of the metal atom include: alkali metals, such as a sodium atom and a potassium atom; alkaline earth metals, such as a calcium atom; and transition metals, such as an iron atom. Examples of the organic amine salt include primary to quaternary amine salts, such as a methylamine salt, a n-butylamine salt, a monoethanolamine salt, a dimethylamine salt, a diethanolamine salt, a morpholine salt, and a trimethylamine salt. Z preferably represents a sodium atom or a potassium atom out of those described above in order to sufficiently express the effects of the present invention.

Any appropriate sulfonic acid group-containing monomer may be adopted as the sulfonic acid group-containing monomer to the extent that the effects of the present invention are not impaired as long as the monomer has a sulfonic acid group and an unsaturated double bond.

An example of the sulfonic acid group-containing monomer is a sulfonic acid group-containing ether compound represented by the general formula (1):

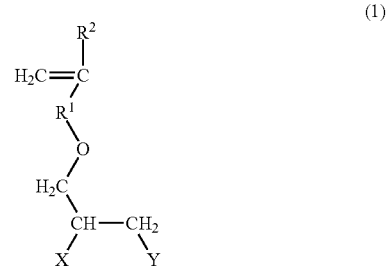

in the general formula (1), $R^1$ represents any one of a single bond, $CH_2$, and $CH_2CH_2$. $R^1$ preferably represents $CH_2$ because the effects of the present invention can be more effectively expressed.

In the general formula (1), $R^2$ represents any one of H and $CH_3$.

In the general formula (1), one of X and Y represents a hydroxyl group, and the other thereof represents a sulfonic acid (salt) group. Here, the term "sulfonic acid (salt) group" means a sulfonic acid group and/or a sulfonic acid salt group. It is preferred that X represent a hydroxyl group and Y represent a sulfonic acid (salt) group because the effects of the present invention can be more effectively expressed.

The sulfonic acid group is represented by $SO_3H$. The sulfonic acid salt group is represented by $SO_3M$. M represents a metal atom, an ammonium group (constituting an ammonium salt, that is, $SO_3NH_4$), or an organic amino group (constituting an organic amine salt). Examples of the metal atom include: alkali metals, such as a sodium atom and a potassium atom; alkaline earth metals, such as a calcium atom; and transition metals, such as an iron atom. Examples of the organic amine salt include primary to quaternary amine salts, such as a methylamine salt, a n-butylamine salt, a monoethanolamine salt, a dimethylamine salt, a diethanolamine salt, a morpholine salt, and a trimethylamine salt. M preferably represents a sodium atom or a potassium atom out of those described above in order to sufficiently express the effects of the present invention.

Specifically, the sulfonic acid group-containing ether compound represented by the general formula (1) is preferably 3-(meth)allyloxy-2-hydroxy-1-propanesulfonic acid (salt), more preferably sodium 3-allyloxy-2-hydroxy-1-propanesulfonate (hereinafter sometimes referred to as "HAPS") because the effects of the present invention can be more effectively expressed.

Examples of the sulfonic acid group-containing monomer also include 2-acrylamido-2-methylpropanesulfonic acid (salt) (hereinafter sometimes referred to as "AMPS (salt)"), (meth)allylsulfonic acid (salt), vinylsulfonic acid (salt), styrenesulfonic acid (salt), 2-sulfoethyl (meth)acrylate, and a conjugated diene sulfonic acid (salt), such as 2-methyl-1,3-butadiene-1-sulfonic acid.

In the monomer composition, a content ratio "carboxyl group-containing monomer/sulfonic acid group-containing monomer" of the carboxyl group-containing monomer to the sulfonic acid group-containing monomer is preferably from 71/29 to 98/2, more preferably from 75/25 to 97/3, still more preferably 80/20 to 96/4, particularly preferably 83/17 to 95/5, most preferably 85/15 to 95/5 in terms of a weight ratio. When the content ratio of the carboxyl group-containing monomer to the sulfonic acid group-containing monomer in the monomer composition falls within the range, a barium-sulfate scale inhibitor that can express a higher barium-sulfate scale-inhibiting ability can be provided.

The monomer composition may contain any other monomer except the carboxyl group-containing monomer and the sulfonic acid group-containing monomer. Such other monomers may be used alone or in combination thereof.

Examples of the other monomer include: monocarboxylic acid monoethylenically unsaturated monomers except (meth)acrylic acid, such as crotonic acid and α-hydroxyacrylic acid, and salts thereof; unsaturated dicarboxylic acids, such as fumaric acid, and salts thereof; N-vinyl monomers, such as N-vinylpyrrolidone, N-vinylformamide, N-vinylacetamide, N-vinyl-N-methylformamide, N-vinyl-N-methylacetamide, and N-vinyloxazolidone; amide-based monomers, such as (meth)acrylamide, N,N-dimethylacrylamide, and N-isopropylacrylamide; (meth)allyloxypropane-based compounds, such as 3-(meth)allyloxy-1,2-dihydroxypropane, and 3-allyloxy-1,2-dihydroxypropane, and compounds obtained by adding 1 mol to 200 mol of ethylene oxide to 1 mol of each of the compounds (e.g., 3-allyloxy-1,2-di(poly)oxyethylene ether propane); allyl ether-based monomers, such as (meth)allyl alcohol and a compound obtained by adding 1 mol to 100 mol of ethylene oxide to 1 mol of (meth)allyl alcohol; (meth)acrylic acid ester-based monomers, such as methyl (meth)acrylate, ethyl (meth)acrylate, butyl (meth)acrylate, hydroxymethyl (meth)acrylate, and hydroxyethyl (meth)acrylate; and isoprene-based monomers, such as isoprenol and a compound obtained by adding 1 mol to 100 mol of ethylene oxide to 1 mol of isoprenol.

In order to further express the effects of the present invention, it is preferred that the monomer composition should not contain a predetermined amount or more of a hydrophobic monomer as the other monomer. Such hydrophobic monomers may be used alone or in combination thereof. The content of the hydrophobic monomer serving as the other monomer in the monomer composition is preferably less than 5 wt %, more preferably less than 4.5 wt %, still more preferably less than 3 wt %, particularly preferably less than 2.5 wt %, most preferably less than 2 wt % in terms of a weight ratio.

Such hydrophobic monomer as described above is, for example, an ether bond-containing monomer (A) described in JP 2015-151414 A.

The content of the other monomer in the monomer composition is preferably from 0 wt % to 20 wt %, more preferably from 0 wt % to 15 wt %, still more preferably from 0 wt % to 10 wt %, particularly preferably from 0 wt % to 5 wt % in terms of a weight ratio. When the content of the other monomer in the monomer composition falls within the range, a barium-sulfate scale inhibitor that can express a higher barium-sulfate scale-inhibiting ability can be provided.

The sulfonic acid group-containing copolymer has a weight-average molecular weight of preferably from 1,000 to 150,000, more preferably from 2,000 to 100,000, still more preferably from 3,000 to 80,000, still more preferably from 4,000 to 60,000, still more preferably from 5,000 to 50,000, still more preferably from 6,000 to 40,000, still more preferably from 6,500 to 30,000, particularly preferably from 7,000 to 20,000, most preferably from 8,000 to 15,000. When the weight-average molecular weight of the sulfonic acid group-containing copolymer falls within the range, a barium-sulfate scale inhibitor that can express a higher barium-sulfate scale-inhibiting ability can be provided.

The sulfonic acid group-containing copolymer may be produced by any appropriate method to the extent that the effects of the present invention are not impaired. Such method is preferably, for example, a method of producing the copolymer through a polymerization reaction involving using a combination of a persulfate, a bisulfite, and a heavy metal ion.

A solvent to be used in a reaction liquid at the time of the polymerization reaction (polymerization reaction liquid) is preferably an aqueous solvent, more preferably water. An organic solvent may be appropriately added for improving the solubility of the monomer composition in the solvent to the extent that the polymerization is not adversely affected. Examples of the organic solvent to be added include: lower alcohols, such as methanol and ethanol; amides, such as dimethylformaldehyde; and ethers, such as diethyl ether and dioxane.

The polymerization reaction liquid preferably contains one or more kinds of persulfates and one or more kinds of bisulfites.

An addition ratio between the persulfate and the bisulfite is preferably as follows: the weight ratio of the bisulfite is from 0.5 to 10 with respect to 1 of the persulfate. When the weight ratio of the bisulfite is less than 0.5 with respect to 1 of the persulfate, an effect by the bisulfite may not be sufficient, and the weight-average molecular weight of a (meth)acrylic acid-based polymer to be obtained may become excessively high. When the weight ratio of the bisulfite is more than 10 with respect to 1 of the persulfate, an effect by the bisulfite commensurate with the addition ratio may not be obtained. However, the blending amount of the persulfate and the bisulfate is not limited to the range, and a specific blending amount of the persulfate and the bisulfate may be determined in accordance with use applications and a use environment.

The addition amount of the persulfate and the bisulfite is preferably from 0.1 g to 20 g, more preferably from 0.5 g to 15 g in terms of the blending amount of the persulfate and the bisulfite with respect to 1 mol of the monomer composition to be used.

Examples of the persulfate include sodium persulfate, potassium persulfate, and ammonium persulfate.

Examples of the bisulfite include sodium bisulfite, potassium bisulfite, and ammonium bisulfite.

A sulfite or a pyrosulfite may be used as required as well as the persulfate and the bisulfite.

The polymerization reaction liquid preferably contains one or more kinds of heavy metal ions. The term "heavy metal" means a metal having a specific weight of 4 g/cm$^3$ or more. Specific examples of the heavy metal include iron, cobalt, manganese, chromium, molybdenum, tungsten, copper, silver, gold, lead, platinum, iridium, osmium, palladium, rhodium, and ruthenium. The polymerization reaction liquid preferably contains an ion of any such metal. The polymerization reaction liquid more preferably contains an iron ion. The ionic valence of the heavy metal ion is not particularly limited. For example, when iron is used as the heavy metal, the iron ion dissolved in the polymerization reaction liquid may be $Fe^{2+}$, may be $Fe^{3+}$, or may be a combination thereof.

The heavy metal ion may be added by using a solution obtained by dissolving a heavy metal compound. The heavy metal compound to be used at that time is determined in accordance with the heavy metal ion that is desired to be incorporated into the polymerization reaction liquid. When water is used as the solvent of the liquid, a water-soluble heavy metal salt is preferred. Examples of the water-soluble heavy metal salt include Mohr's salt (Fe(NH$_4$)$_2$ (SO$_4$)$_2$·6H$_2$O), ferrous sulfate heptahydrate, ferrous chloride, ferric chloride, and manganese chloride.

The content of the heavy metal ion is preferably from 0.1 ppm to 10 ppm with respect to the total weight of the polymerization reaction liquid at the time of the completion of the polymerization reaction. The phrase "at the time of the completion of the polymerization reaction" means the time point when the polymerization reaction is substantially completed in the polymerization reaction liquid and hence a desired polymer is obtained. For example, when the polymer polymerized in the polymerization reaction liquid is neutralized with an alkali component, the content of the heavy metal ion is calculated with reference to the total weight of the polymerization reaction liquid after the neutralization. When the liquid contains two or more kinds of heavy metal ions, the total amount of the heavy metal ions only needs to fall within the range.

When the content of the heavy metal ion is less than 0.1 ppm, an effect by the heavy metal ion may not be sufficiently expressed. Meanwhile, when the content of the heavy metal ion is more than 10 ppm, contamination at the time of the use of the copolymer as a detergent builder, or a scale at the time of its use as a scale inhibitor may increase.

Any appropriate method may be adopted as a polymerization method. One preferred embodiment is a method involving dropping the monomer composition, the persulfate, and the bisulfite into an aqueous solution blended with the heavy metal ion in advance.

Any appropriate time may be adopted as the dropping time of each of the components. Any appropriate rate may be adopted as the dropping rate of each of the components.

A polymerization temperature is preferably from 25° C. to 99° C., more preferably from 50° C. to 95° C., still more preferably 70° C. or more and less than 90° C. When the polymerization temperature is less than 25° C., the weight-average molecular weight of the polymer to be obtained may excessively increase, or the amount of impurities to be produced may increase. In addition, a polymerization time lengthens and hence the productivity of the polymer may reduce. Meanwhile, when the polymerization temperature is more than 99° C., the bisulfate may decompose to produce a large amount of a sulfurous acid gas. The sulfurous acid gas dissolved in a liquid phase may be a causative agent for impurities, and hence the production of a large amount of the sulfurous acid gas may increase the amount of impurities in the polymer to be obtained. In addition, cost for the recovery of the sulfurous acid gas in a gas phase may increase. The term "polymerization temperature" refers to the temperature of the polymerization reaction liquid. Any appropriate method and apparatus may be used as a method of measuring the polymerization temperature and means for controlling the temperature.

Any appropriate pressure may be adopted as a pressure at the time of the polymerization. The polymerization may be performed under, for example, any one of the following pressures: normal pressure, reduced pressure, and increased pressure.

The sulfonic acid group-containing copolymer may be preferably produced in the form of an aqueous solution by the foregoing reaction.

When the barium-sulfate scale inhibitor of the present invention is added at a solid content concentration of 1 wt % to high-salt-concentration water having a metal salt concentration of 10 wt % or more, the sulfonic acid group-containing copolymer is free from precipitating. That is, the barium-sulfate scale inhibitor of the present invention is excellent in solubility in the high-salt-concentration water, and the presence of such characteristic enables the inhibitor to express a high barium-sulfate scale-inhibiting ability. A related-art barium-sulfate scale inhibitor is poor in solubility in the high-salt-concentration water, and hence hardly expresses a sufficient barium-sulfate scale-inhibiting ability. The high-salt-concentration water is, for example, high-salt-concentration water present in a drilling pipe in crude oil drilling.

The metal salt concentration is preferably from 10 wt % to 30 wt %, more preferably from 10 wt % to 27 wt %, still more preferably from 10 wt % to 23 wt %, particularly preferably from 10 wt % to 20 wt %.

Examples of the metal salt in the high-salt-concentration water include sodium chloride, iron sulfate, barium chloride, calcium chloride, magnesium chloride, sodium carbonate, calcium carbonate, and barium hydroxide.

<<Method of Inhibiting Barium-Sulfate Scale>>

A method of inhibiting a barium-sulfate scale of the present invention is a method of inhibiting the formation of a barium-sulfate scale in a drilling pipe in crude oil drilling.

The method of inhibiting a barium-sulfate scale of the present invention includes adding a barium-sulfate scale inhibitor to the drilling pipe. High-salt-concentration water is present in the drilling pipe.

The high-salt-concentration water in the drilling pipe contains a metal salt. Examples of such metal salt include the metal salts listed in the section <<Barium-sulfate Scale Inhibitor>>. The concentration of the metal salt in the high-salt-concentration water in the drilling pipe is preferably 10 wt % or more, more preferably from 10 wt % to 30 wt %, still more preferably from 10 wt % to 27 wt %, particularly preferably from 10 wt % to 23 wt %, most preferably from 10 wt % to 20 wt %.

In the method of inhibiting a barium-sulfate scale of the present invention, the barium-sulfate scale inhibitor is added to the high-salt-concentration water present in the drilling pipe so that the concentration of the barium-sulfate scale inhibitor is preferably from 0.1 ppm to 1,000 ppm in terms of a solid content. The addition amount is more preferably from 0.5 ppm to 500 ppm, still more preferably from 0.8 ppm to 200 ppm, particularly preferably from 2.0 ppm to 50 ppm. When the addition amount of the barium-sulfate scale inhibitor falls within the range, a higher barium-sulfate scale-inhibiting ability can be expressed in the method of inhibiting a barium-sulfate scale of the present invention.

The barium-sulfate scale inhibitor to be used in the method of inhibiting a barium-sulfate scale of the present invention is a barium-sulfate scale inhibitor containing a sulfonic acid group-containing copolymer obtained by polymerizing a monomer composition containing a carboxyl group-containing monomer and a sulfonic acid group-containing monomer, the sulfonic acid group-containing copolymer being free from precipitating when the barium-sulfate scale inhibitor is added at a solid content concentration of 1 wt % to high-salt-concentration water having a metal salt concentration of 10 wt % or more. Such barium-sulfate scale inhibitor is, for example, the barium-sulfate scale inhibitor described in the section <<Barium-sulfate Scale Inhibitor>>.

<<Barium-Sulfate Scale Inhibitor Composition>>

A barium-sulfate scale inhibitor composition of the present invention contains water and a sulfonic acid group-containing copolymer.

The barium-sulfate scale inhibitor composition of the present invention may contain any appropriate other component to the extent that the effects of the present invention are not impaired as long as the composition contains the water and the sulfonic acid group-containing copolymer.

The total content of the water and the sulfonic acid group-containing copolymer in the barium-sulfate scale inhibitor composition of the present invention is preferably from 50 wt % to 100 wt %, more preferably from 70 wt % to 100 wt %, still more preferably from 90 wt % to 100 wt %, particularly preferably from 95 wt % to 100 wt %, most preferably substantially 100 wt % in terms of a weight ratio.

In the barium-sulfate scale inhibitor composition of the present invention, the content of the sulfonic acid group-containing copolymer in the barium-sulfate scale inhibitor composition with respect to the water is preferably from 0.1 ppm to 1,000 ppm, more preferably from 0.5 ppm to 500 ppm, still more preferably from 0.8 ppm to 200 ppm, still more preferably from 1.0 ppm to 100 ppm, particularly preferably from 2.0 ppm to 50 ppm, most preferably from 3.0 ppm to 20 ppm in terms of a solid content. When the content of the sulfonic acid group-containing copolymer in the barium-sulfate scale inhibitor composition of the present invention falls within the range, a barium-sulfate scale inhibitor composition that can express a higher barium-sulfate scale-inhibiting ability can be provided.

Any appropriate water may be adopted as the water to the extent that the effects of the present invention are not impaired. Such water is preferably ion-exchanged water from which metal ions have been removed with an ion exchange resin.

The sulfonic acid group-containing copolymer is obtained by polymerizing a monomer composition containing a carboxyl group-containing monomer and a sulfonic acid group-containing monomer. The carboxyl group-containing monomers may be used alone or in combination thereof. The sulfonic acid group-containing monomers may be used alone or in combination thereof. The sulfonic acid group-containing copolymer is, for example, the sulfonic acid group-containing copolymer described in the section <<Barium-sulfate Scale Inhibitor>>.

EXAMPLES

Now, the present invention is specifically described by way of Examples. However, the present invention is by no means limited to these Examples. The terms "part(s)" and "%" in Examples are by weight unless otherwise stated.
<Measurement Conditions (GPC) for Weight-Average Molecular Weight>

The measurement of a weight-average molecular weight was performed under the following conditions.
Apparatus: L-7000 series manufactured by Hitachi, Ltd.
Detector: HITACHI RI Detector L-7490
Column: SHODEX Asahipak GF-310-HQ, GF-710-HQ, GF-1G 7B, manufactured by Showa Denko K.K.
Column temperature: 40° C.
Flow rate: 0.5 ml/min
Calibration curve: Polyacrylic acid standard manufactured by Sowa
Science Corporation
Eluent: 0.1 N sodium acetate/acetonitrile=3/1 (weight ratio)
<Test for Solubility in High-Salt-Concentration Water>

Grams of NaCl and 3 g of $CaCl_2$ were loaded into a 100-cubic-centimeter beaker, and 67 g of ion-exchanged water was loaded to dissolve the materials. A solution thus obtained was defined as a solution (1). 10 Grams of a liquid obtained by diluting a polymer described in Examples with ion-exchanged water to a concentration of 10 wt % in terms of a solid content in another 100-cubic-centimeter beaker was defined as a solution (2). The solution (1) and the solution (2) were loaded into a 200-cubic-centimeter container at 25° C., and were stirred with a magnetic stirrer at 25° C. for 2 minutes. A solution after the stirring was left at rest for 1 minute at 25° C., and then its transparent state was visually observed.

Synthesis Example 1

979.4 Grams of pure water was loaded into a separable flask made of SUS316 including a temperature gauge, a reflux condenser, and a stirring machine, and having a volume of 5 L, and its temperature was increased to 87° C. under stirring (initial loading).

Next, under stirring, 1,362.6 g of an 80 wt % aqueous solution of acrylic acid (hereinafter abbreviated as "80% AA"), 434.6 g of a 40 wt % aqueous solution of sodium 3-allyloxy-2-hydroxy-1-propanesulfonate (hereinafter abbreviated as "40% HAPS"), 159.4 g of a 15 wt % aqueous solution of sodium persulfate (hereinafter abbreviated as "15% NaPS"), 163.9 g of a wt % aqueous solution of sodium bisulfite (hereinafter abbreviated as "35% SBS"), 83.4 g of a 48 wt % aqueous solution of sodium hydroxide (hereinafter abbreviated as "48% NaOH"), 11.3 g (3 ppm in terms of the weight of iron(II) with respect to the total loading amount (the term "total loading amount" as used herein refers to the amount of all loaded substances including a neutralization step after the completion of polymerization, and the same holds true for the following)) of a 0.6 wt % aqueous solution of Mohr's salt (hereinafter abbreviated as "0.6% Mohr's salt"), and 5.5 g of a 35 wt % aqueous solution of hydrogen peroxide (hereinafter abbreviated as "35% HP") were dropped from dropping nozzles different from one another into a polymerization reaction system kept at a constant temperature of 87° C. The dropping times of the respective solutions were as follows: the 80% AA was dropped for 180 minutes; the 40% HAPS was dropped for 155 minutes; the 35% SBS was dropped for 175 minutes; the 15% NaPS was dropped for 200 minutes; the 48% NaOH was dropped for 180 minutes; the 0.6% Mohr's salt was collectively dropped; and the 35% HP was dropped for 5 minutes. In addition, with regard to a dropping initiation time, first, the 35% SBS was dropped, and 5 minutes after that, the droppings of the 80% AA, the 40% HAPS, the 15% NaPS, and the 48% NaOH were initiated. The 0.6% Mohr's salt was collectively loaded 15 minutes after the initiation of the dropping of the 35% SBS, and the dropping of the 35% HP was initiated 190 minutes after the initiation of the dropping of the 35% SBS. 87 Grams of the 40% HAPS was continuously dropped at a constant dropping rate in a time period from 0 minutes after the initiation of the dropping of the 40% HAPS to 15 minutes thereafter, and the remaining 347.6 g thereof was continuously dropped at a constant dropping rate in a time period from 15 minutes after the initiation of the dropping of the 40% HAPS to 155 minutes thereafter. The dropping rate of each of the 80% AA, the 15% NaPS, the 35% SBS, the 48% NaOH, and the 35% HP was kept constant during its dropping time, and the solutions were continuously dropped.

After the completion of the droppings, the polymerization was completed by further retaining a reaction solution at 87° C. over 60 minutes to age the solution. Thus, a polymer composition (1) containing a polymer (1) and water was obtained.

The weight-average molecular weight of the polymer (1) was 11,000.

The result is shown in Table 1.

Synthesis Example 2

A polymer composition (2) containing a polymer (2) and water was obtained in the same manner as in Synthesis Example 1 except that in Synthesis Example 1, the following changes were made: the amount of the 40% HAPS was changed to 167 g; and 30 g of the 40% HAPS was dropped in a time period from 0 minutes after the initiation of the dropping of the 40% HAPS to 15 minutes thereafter, and the remaining 137 g of the 40% HAPS was dropped in a time period from 15 minutes after the initiation of the dropping of the 40% HAPS to 155 minutes thereafter.

The weight-average molecular weight of the polymer (2) was 9,500.

The result is shown in Table 1.

Synthesis Example 3

A polymer composition (3) containing a polymer (3) and water was obtained in the same manner as in Synthesis Example 1 except that in Synthesis Example 1, the following changes were made: the amount of the 40% HAPS was changed to 908 g; and 180 g of the 40% HAPS was dropped in a time period from 0 minutes after the initiation of the dropping of the 40% HAPS to 15 minutes thereafter, and the remaining 728 g of the 40% HAPS was dropped in a time period from 15 minutes after the initiation of the dropping of the 40% HAPS to 155 minutes thereafter.

The weight-average molecular weight of the polymer (3) was 11,000.

The result is shown in Table 1.

Synthesis Example 4

A polymer composition (4) containing a polymer (4) and water was obtained in the same manner as in Synthesis Example 1 except that in Synthesis Example 1, 908 g of a 40 wt % aqueous solution of sodium acrylamide propanesulfonate (40% AMPS) was used instead of the 40% HAPS, and 250 g of a 35 wt % aqueous solution of sodium bisulfite (35% SBS) was used.

The weight-average molecular weight of the polymer (4) was 5,000.

The result is shown in Table 1.

Synthesis Example 5

622.7 Grams of pure water and 0.0171 g of Mohr's salt were loaded into a separable flask made of SUS316 including a temperature gauge, a reflux condenser, and a stirring machine, and having a volume of 5 L, and its temperature was increased to 85° C. under stirring (initial loading).

Next, under stirring, 900.0 g of 80% AA, 46.2 g of 15% NaPS, and 125.7 g of 35% SBS were dropped from dropping nozzles different from one another into a polymerization reaction system kept at a constant temperature of 85° C. The dropping times of the respective solutions were as follows: the 80% AA was dropped for 120 minutes; the 15% NaPS was dropped for 180 minutes; and the 35% SBS was dropped for 115 minutes. In addition, with regard to a dropping initiation time, the droppings of all the respective dropping liquids were simultaneously initiated. The dropping rate of each of the dropping liquids was kept constant during its dropping time, and the liquids were continuously dropped.

After the completion of the droppings, a reaction solution was further retained at 85° C. over 30 minutes to be aged, followed by the addition of 9.5 g of the 35% HP. Thus, a polymer composition (C1) containing a polymer (C1) and water was obtained.

The weight-average molecular weight of the polymer (C1) was 6,000.

The result is shown in Table 1.

Example 1

A test liquid A was prepared by dissolving 0.023 g of barium chloride in 50 g of ion-exchanged water.

A test liquid B was prepared by dissolving 0.373 g of magnesium chloride, 5.08 g of sodium chloride, 0.45 g of calcium chloride, 0.082 g of potassium chloride, 0.32 g of sodium sulfate, and 1 g of a 0.1 wt % aqueous solution (in terms of a solid content) of the polymer composition (1) obtained in Synthesis Example 1 in 50 g of ion-exchanged water.

The test liquid A and the test liquid B were stirred and mixed while being heated. Thus, a scale inhibitor composition (1) was obtained. The temperature of the resultant scale inhibitor composition (1) was increased to 80° C. in 10 minutes. Immediately after the temperature had been increased to 80° C., the composition was left at rest at 80° C. for 2 hours. After that, the temperature was decreased to 30° C. in 10 minutes, and a supernatant was collected, followed by the measurement of its Ba concentration by ICP analysis. The Ba concentration of the mixed test liquid without any heat treatment was also measured by ICP analysis.

A barium-sulfate scale-inhibiting ability was calculated from the following calculation equation.

Barium-sulfate scale-inhibiting ability (%)=[(Ba concentration after heating)/(Ba concentration before heating)]×100

The result is shown in Table 2.

The content of a (meth)acrylic acid-based polymer in terms of a solid content with respect to water calculated from the following calculation equation was 10 ppm.

Content (ppm) of (meth)acrylic acid-based polymer in terms of solid content with respect to water= [solid content (g) in polymer composition/{test liquid A (g)+test liquid B (g)}]×1,000,000

The result of the test for solubility in high-salt-concentration water is also shown in Table 2.

Example 2

A barium-sulfate scale-inhibiting ability was calculated by performing an experiment in the same manner as in Example 1 except that in Example 1, the scale inhibitor composition (2) was obtained instead of the scale inhibitor composition (1) by using the polymer composition (2) obtained in Synthesis Example 2 instead of the polymer composition (1) obtained in Synthesis Example 1.

The result is shown in Table 2.

The result of the test for solubility in high-salt-concentration water is also shown in Table 2.

Example 3

A barium-sulfate scale-inhibiting ability was calculated by performing an experiment in the same manner as in Example 1 except that in Example 1, the scale inhibitor composition (3) was obtained instead of the scale inhibitor composition (1) by using the polymer composition (3) obtained in Synthesis Example 3 instead of the polymer composition (1) obtained in Synthesis Example 1.

The result is shown in Table 2.

The result of the test for solubility in high-salt-concentration water is also shown in Table 2.

Example 4

A barium-sulfate scale-inhibiting ability was calculated by performing an experiment in the same manner as in Example 1 except that in Example 1, the scale inhibitor composition (4) was obtained instead of the scale inhibitor composition (1) by using the polymer composition (4) obtained in Synthesis Example 4 instead of the polymer composition (1) obtained in Synthesis Example 1.

The result is shown in Table 2.

The result of the test for solubility in high-salt-concentration water is also shown in Table 2.

Comparative Example 1

A barium-sulfate scale-inhibiting ability was calculated by performing an experiment in the same manner as in Example 1 except that in Example 1, the composition (C1) was obtained instead of the scale inhibitor composition (1) by using the polymer composition (C1) obtained in Synthesis Example 5 instead of the polymer composition (1) obtained in Synthesis Example 1.

The result is shown in Table 2.

The result of the test for solubility in high-salt-concentration water is also shown in Table 2.

TABLE 1

| Polymer | Weight-average molecular weight | Wt % | | |
|---|---|---|---|---|
| | | AA | HAPS | AMPS |
| (1) | 11,000 | 86 | 14 | 0 |
| (2) | 9,500 | 94 | 6 | 0 |
| (3) | 11,000 | 75 | 25 | 0 |
| (4) | 5,000 | 75 | 0 | 25 |
| (C1) | 6,000 | 100 | 0 | 0 |

TABLE 2

| | Polymer composition | Barium-sulfate scale-inhibiting ability | Test for solubility in high-salt-concentration water |
|---|---|---|---|
| Example 1 | (1) | 98% | Transparent |
| Example 2 | (2) | 95% | Transparent |
| Example 3 | (3) | 88% | Transparent |
| Example 4 | (4) | 56% | Transparent |
| Cmoparative Example 1 | (C1) | 78% | White turbidity and precipitation |

INDUSTRIAL APPLICABILITY

According to the present invention, the barium-sulfate scale inhibitor and the barium-sulfate scale inhibitor composition each of which can express a high barium-sulfate scale-inhibiting ability can be provided. According to the present invention, the method of inhibiting a barium-sulfate scale that can express a high barium-sulfate scale-inhibiting ability can also be provided. The barium-sulfate scale inhibitor, the barium-sulfate scale inhibitor composition, and the method of inhibiting a barium-sulfate scale can be suitably utilized in crude oil drilling.

The invention claimed is:

1. A barium-sulfate scale inhibitor, comprising a sulfonic acid group-containing copolymer obtained by polymerizing a monomer composition containing a carboxyl group-containing monomer and a sulfonic acid group-containing monomer, wherein a content ratio "carboxyl group-containing monomer/sulfonic acid group-containing monomer" of the carboxyl group-containing monomer to the sulfonic acid group-containing monomer is from 71/29 to 98/2 in terms of a weight ratio, wherein the sulfonic acid group-containing monomer comprises a sulfonic acid group-containing ether compound represented by the general formula (1):

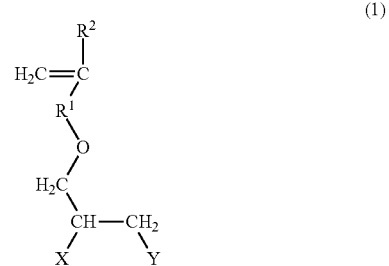

in the general formula (1), $R^1$ represents any one of a single bond, $CH_2$, and $CH_2CH_2$, $R^2$ represents any one of H and $CH_3$, and one of X and Y represents a hydroxyl group, and another thereof represents a sulfonic acid (salt) group, and wherein when the barium-sulfate scale inhibitor is added at a solid content concentration of 1 wt % to high-salt-concentration water having a metal salt concentration of 10 wt % or more, the sulfonic acid group-containing copolymer is free from precipitating.

2. A method of inhibiting formation of a barium sulfate scale in a drilling pipe in crude oil drilling, the method comprising adding, to the drilling pipe, barium-sulfate scale inhibitor, comprising a sulfonic acid group-containing copolymer obtained by polymerizing a monomer composition containing a carboxyl group-containing monomer and a sulfonic acid group-containing monomer, wherein a content ratio "carboxyl group-containing monomer/sulfonic acid group-containing monomer" of the carboxyl group-containing monomer to the sulfonic acid group-containing monomer is from 71/29 to 98/2 in terms of a weight ratio, wherein the sulfonic acid group-containing monomer comprises a sulfonic acid group-containing ether compound represented by the general formula (1):

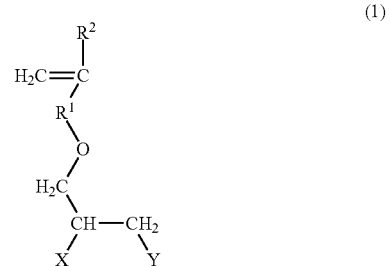

in the general formula (1), $R^1$ represents any one of a single bond, $CH_2$, and $CH_2$, $R^2$ represents any one of H and $CH_3$, and one of X and Y represents a hydroxyl group, and another thereof represents a sulfonic acid (salt) group, and wherein when the barium-sulfate scale inhibitor is added at a solid content concentration of 1 wt % to high-salt-concentration water having a metal salt concentration of 10 wt % or more, the sulfonic acid group-containing copolymer is free from precipitating.

3. The method of inhibiting a barium-sulfate scale according to claim 2, wherein the barium-sulfate scale inhibitor is added to the high-salt-concentration water present in the drilling pipe so that a concentration of the barium-sulfate scale inhibitor is from 0.1 ppm to 1,000 ppm in terms of a solid content.

4. A barium-sulfate scale inhibitor composition, comprising:
water; and
a sulfonic acid group-containing copolymer obtained by polymerizing a monomer composition containing a carboxyl group-containing monomer and a sulfonic acid group-containing monomer, wherein a content ratio "carboxyl group-containing monomer/sulfonic acid group-containing monomer" of the carboxyl group-containing monomer to the sulfonic acid group-containing monomer is from 71/29 to 98/2 in terms of a weight ratio, wherein the sulfonic acid group-containing monomer comprises a sulfonic acid group-containing ether compound represented by the general formula (1):

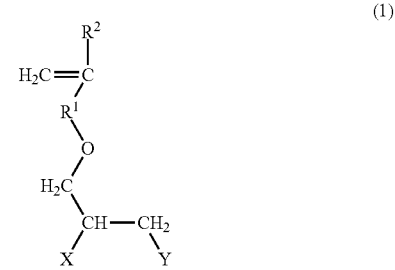

in the general formula (1), $R^1$ represents any one of a single bond, $CH_2$, and $CH_2$, $R^2$ represents any one of H and $CH_3$, and one of X and Y represents a hydroxyl group, and another thereof represents a sulfonic acid (salt) group, and wherein when the barium-sulfate scale inhibitor is added at a solid content concentration of 1 wt % to high-salt-concentration water having a metal salt concentration of 10 wt % or more, the sulfonic acid group-containing copolymer is free from precipitating.

5. The barium-sulfate scale inhibitor composition according to claim 4, wherein a content of the sulfonic acid group-containing copolymer in the barium-sulfate scale inhibitor composition with respect to the water is from 0.1 ppm to 1,000 ppm in terms of a solid content.

* * * * *